Figure 1:
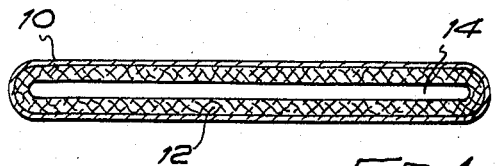

United States Patent [19]

Wood

[11] Patent Number: 4,581,247

[45] Date of Patent: Apr. 8, 1986

[54] LINING OF PIPELINES AND PASSAGEWAYS

[75] Inventor: Eric Wood, Wellingborough, England

[73] Assignee: Insituform International N.V., Netherlands, Netherlands

[21] Appl. No.: 686,996

[22] Filed: Dec. 27, 1984

[30] Foreign Application Priority Data

Jan. 5, 1984 [GB] United Kingdom ............... 8400233

[51] Int. Cl.⁴ .................. B05D 3/06; B29C 17/00
[52] U.S. Cl. ........................... 427/53.1; 156/199;
156/272.2; 156/287; 156/294; 156/380.9;
427/54.1; 427/230; 427/386; 427/393.5
[58] Field of Search ............... 156/272.2, 287, 294,
156/380.9, 199; 427/54.1, 230, 238, 239, 53.1,
386, 388.2, 393.5

[56] References Cited

U.S. PATENT DOCUMENTS

| 3,804,663 | 4/1974 | Clark | 427/55 X |
| 4,135,958 | 1/1979 | Wood | 156/199 |
| 4,439,469 | 3/1984 | Wood | 427/230 |

FOREIGN PATENT DOCUMENTS 2018384 10/1979 United Kingdom.

*Primary Examiner*—Michael R. Lusignan
*Attorney, Agent, or Firm*—Fred Philpitt

[57] ABSTRACT

The present invention provides that in the lining of a pipeline or passageway using a flexible lining comprising a resin absorbent felt, the felt is impregnated with a light curing resin, and light radiation is used for effecting the resin cure. The resin and felt are selected so as to be of a similar refractive index, and so that the resin and fibres are substantially transparent to the curing light radiation which is used. The lining is pre-impregnated and then contained a bag, envelope or sachet of opaque material to prevent it from curing prematurely.

9 Claims, 3 Drawing Figures

U.S. Patent  Apr. 8, 1986  4,581,247

LINING OF PIPELINES AND PASSAGEWAYS

This invention relates to the lining of pipelines and passageways by the now well established and successful method of shaping a lining tube, which is flexible in nature when installed, to the pipeline or passageway surface, and then curing synthetic resin embodied in the lining thickness to a hard state, whereby the lining becomes free standing and is shaped to the pipeline or passageway surface.

In the most widely practiced form of this invention, for example as disclosed in British Pat. No. 1,449,455, to which reference is made, the flexible lining tube comprises one or more layers of fibrous material, such as a needled felt which is impregnated with the curable resin, the felt or fibrous material forming an ideal absorbing material ensuring effective take-up of the resin to provide a finished liner of the required thickness. Bonded to one side of this fibrous material is an impermeable (for example polyurethane) film. When the lining tube is first manufactured, the film is to the outside of the felt material, which enables impregnation by charging a quantity of resin into the inside of the flexible tube, if necessary applying a vacuum to the inside of the tube to remove air from the felt and then by squeezing the tube for example by passing it through nip rollers, in order to ensure even distribution of the resin in the felt material.

When the flexible lining tube is inserted in the pipeline or passageway, one end of it is anchored, and then the remainder of the tube is everted through the anchored end so that the tube everts into the pipeline or passageway, and onto the surface to be lined. The everting medium is usually a liquid, and when the eversion process is completed, the liquid remains inside the everted tube to keep it to the pipeline or passageway surface shape whilst the resin cures. To this end, heated water is usually circulated through the everted tube in order to effect or accelerate the cure initiation process. After curing has commenced with the type of resin normally used, the cure usually continues naturally until curing is completed.

In another embodiment of carrying out the lining process, the lining tube is not everted, but is fed into the pipeline or passageway and then is inflated using heated fluid which may be water or air to shape the lining tube to the passageway surface. In this arrangement, the lining tube must be constructed differently, and has to be provided with an internal plastic impermeable membrane in the form of a tube, for effecting the inflation process. Optionally, the lining may be provided with an outer membrane to prevent contact of the resin with the surface being lined.

In each case, the lining tube is of course flexible and manipulable, even when impregnated with resin, prior to the insertion step. In each case however the lining tube is tailored to the size of the pipeline or passageway to be lined, so that the tube will not suffer excessive tension or elongation when it is held by the fluid pressure to the pipeline or passageway surface.

The known methods effect a satisfactory lining, but the methods have disadvantages namely that they are expensive in requiring a boiler and the heating of water when water is used as the heating medium, and they can be slow as it does take some time for the curing to be sufficiently complete to enable the fluid pressure holding the lining to the surface to be removed.

The present invention is concerned with the provision of an alternative means of effecting curing of the resin in a lining without requiring a means for heating water.

It is well known to effect the cure of synthetic resin using a light radiation source, the resin being suitably modified to include a catalyst agent or hardener which is activated by radiation of a particular wave length. However, the difficulty of achieving a light activated cure of the resinous materials in a lining used for the lining process as described above, has been that using the commercially suggested materials has not resulted in sufficient penetration of the curing light into the thickness of the lining tube to effect a satisfactory cure. Using conventional materials and the recommended light source, a curing depth of only some 1 or 2 millimeters could be achieved, which is unacceptable.

The present invention has however recognized that much deeper cure penetration can be achieved by appropriate selection of the materials, and in accordance with the present invention curing of a light curing resin in lining material is effected efficiently using a light curing source which initiates the light activated catalyst in the resin, if the fibrous material and the light curing resin are selected so as to have the same or approximately the same refractive index, and so that when the fibrous layer is impregnated with the resin, the combined fibrous layer and resin will be substantially transparent to the curing light. It is to be noted that in practice, when light radiation passes through transparent material there is always a proportion of the radiation absorbed by the material. In addition there is a proportion lost at any surface between two materials of differing refractive indices due to reflection and such loss is greater when the light radiation is travelling at an angle other than perpendicular to the surface as will be the case of a fibre of circular cross section embedden in resin. The matching of the refractive indices is therefore an important aspect of this invention as it mitigates against loss of light radiation due to internal reflection.

When the fibrous material has a coating or film applied thereto, as will usually be the case, the coating or film will preferably have a refractive index making it transparent to the radiation used for curing the resin.

If these criteria are satisfied, it is found that there is high transmission of the curing light, through the lining, enabling the light to fall on the catalyst to initiate the cure throughout the lining thickness.

The light curing method suitable for all sizes of lining tubes; in the case of large diameter lining tubes, the light curing source can be inserted in the inflated tube to effect curing of the resin. In other methods where water is used for holding the lining in position on the passageway surface whilst cure is affected, the light curing source or sources may be immersed in water.

The fibrous layer and the resin must of course be carefully selected to achieve the abovementioned parameters. The time during which the lining tube must be subjected to the curing light radiation will depend upon the thickness of the lining tube and the intensity of curing light. Tests have shown that light curing can be effected to a depth of as much as 30 millimeters, although it has been found desireable to reduce the catalyst content of the resin the thicker the lining.

To enhance the process even further, the surface of the pipeline or passageway to which the raw resin impregnated felt surface is applied (when no outer membrane is provided) may be pre-treated with a catalyst or hardener powder which accelerates curing of the resin in the boundary layer where the resin impregnated felt contacts the surface having said accelerator or hardener. The hardener powder which is applied to the pipeline or passageway and is contacted by the raw resin impregnated fibrous material may be for example di ethyl analine when benzol peroxide is incorporated in the resin. In an alternative arrangement the pipeline or passageway is first of all lined with a means such as a foil, film or membrane defining a reflective inner surface so that light passing through the lining wall meets such reflective surface and will be reflected back through the lining further enhancing the cure; the reflective surface may be defined by a metal foil or metallised film.

By way of example, the light curing catalyst which is embodied in the resin preferably is such as to be initiated by the passage through the resin impregnated felt of radiation of wave length 300 to 500 nanometers but this range is not be taken as limiting. Typically, sun lamps of the type used in domestic dwellings for sun tanning the skin issue light radiation of this wave length. This light has a nonburning characteristic.

The light curing catalyst may be a photo sensitive dye or a blend of light curing agents and/or peroxides.

Conventionally, ultraviolet light has been used for resin curing, but this is light which has a wave length of 300 to 360 nanometers or less and has low penetration into the felt layer. Also, ultraviolet light gives the problem of ozone generation. However, it is within the scope of this invention that ultraviolet radiation can be used.

Any of a variety of fibrous webs may be used, and typically a needled felt of polypropylene or acrylic bright fibres may be used. Bright fibres are fibres in relation to which no material such as titanium dioxide has been added to make them opaque. The resin may be a modified polyester, the modification comprising varying the styrene or adding a predetermined amount of methyl acrylate or similar modifier in the polyester to give a resin which is light curable and has the correct refractive index matching that of the fibres of the fibrous layer. One suitable resin is the light curable resin sold by BASF under the Trade Name PALATAL designation 55-54 using an acrylic felt of "bright" acrylic fibres of which the catalyst is activated by light radiation of a wavelength of 380 nanometers but other catalysts and light radiation of appropriate wavelength can be used. Epoxy resin can also be used.

Many synthetic fibres contain additives which make them opaque and others exhibit differing refractive indices in different directions. It is preferred that bright fibres of polypropylene and acrylic fibres be used in this invention.

We have carried out certain testing using light curing resin on a lining of fibrous material. Specifically, the BASF resin 55-54 has been used with acrylic felt with good effect. Using a 10" diameter lining of 10 mm thick, the felt being of acrylic material and the resin being as above, with an input power of 0.03 of a kilowatt/kilogramme of resin a resulting hardened liner of modulus 450,000 psi and a flexural strength of 11,500 psi can be achieved.

As an added feature, the resin may contain an additional hardening system to ensure complete curing of the resin even in parts where the radiation does not reach the catalyst, such additional hardening system being initiated by the heat generated when curing as indicated by the radiation.

Curing speed and degree of cure can be improved possibly by the following modifications.

1. The use an accelerator to accelerate the cure, and specifically the accelerator Triganox 21S.
2. The use of high levels of light initiating catalyst.
3. The use of clean water for inversion of the lining when inversion takes place using liquid.

By using curing of linings as envisaged in the present invention, considerable installation time savings can be effected.

The lining when impregnated is contained in an opaque sachet or envelope which keeps it from curing prematurely and is only opened when ready for use.

The present invention carries a number of advantages in the lining process described herein, including the following.

1. There is no requirement to provide a heating means such as a boiler on site for heating up water which is normally used to effect a cure.

b 2. The size of the equipment which must be on site is much reduced, because the heating apparatus normally comprising a boiler is voluminous and heavy.

3. The speed of cure is considerably increased, which means that the work of installation can be carried out much quicker, and in a fraction of the time using heat curing. In this regard, a comparison based on approximate figures would seem to sugest that light curing can be effected in approximately one-third of the time it takes to cure the lining using hot water and also results in much less thermal stress in the liner.

4. The overall installation operation is safer because of the absence of the heating apparatus.

Figure 3:
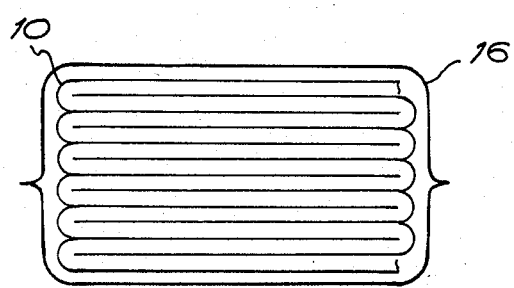

The accompanying drawing is included by way of example to illustrate an embodiment of the process. In FIG. 1 there is shown in cross section a flexible lining tube which is used for the lining of a passageway. The tube comprises an outer film 10 which is bonded to an inner layer 12 of fibrous material, suitably in the form of a needled felt. To prepare the tube for the lining of a passageway, the resin is inserted into the centre 14 of the tube, and then is fed throughout the felt layer 12 so as to impregnate same. The thus impregnated lining tube can then for example be folded as indicated in FIG. 3 for storage and/or transportation. The folded lining may suitably be encased in an envelope 16 which is of opaque material to prevent light radiation from falling on the lining, in that the resin which impregnates the felt is a light radiation curable resin. Clearly, it is desireable that the resin should not be cured prematurely.

Figure 2:
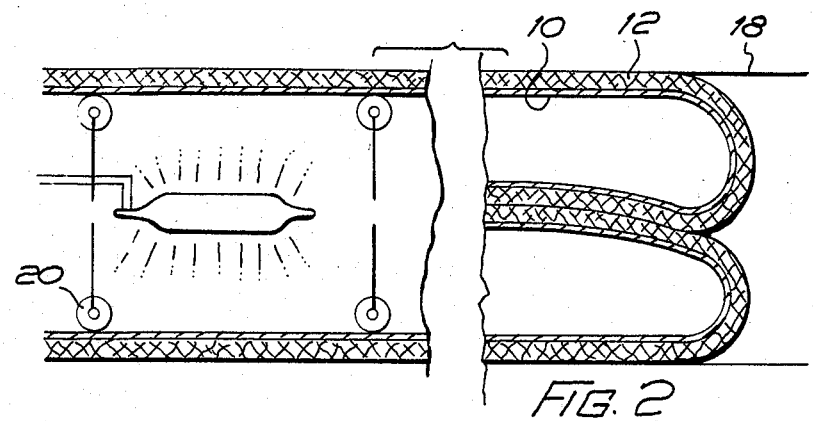

To insert the lining in a passageway, indicated by reference to FIG. 2, as is disclosed in said British patent, one end of the lining tube is anchored, and then water or other suitable pressure medium is used to evert the lining into and along the passageway 18 so that the felt layer 12 is presented to the passageway surface, and the membrane 10 lies to the inside of the everted tube. It should be mentioned that the felt layer may be made up of a plurality of layers depending upon the final thickness required. In order to effect the cure of the resin, a light radiation source 20 is positioned inside the everted lining so that radiation therefrom can fall upon the lining on the passageway surface.

In accordance, with the preferred embodiment of the invention, the light source is chosen to have a wavelength matching the initiating catalyst contained in the light curable resin so that light falling on such catalyst will effect initiation of the curing of the resin. Furthermore, the fibrous material 12 is chosen to have fibres which are substantially of the same refractive index as that of the resin to eliminate internal reflections as far as possible, and preferably the fibres are of the "bright" variety for the reasons explained herein. With this arrangement, the resin and fibres are such as to allow the light radiation to penetrate through the entire thickness and therefore to reach the initiator which is distributed throughout the resin, thereby to ensure that curing of the resin throughout the entire thickness of the lining, which is important, takes place.

In order to assist the process, the surface 18 may be prelined with a reflective material, in the form of a powder or metallic foil or film which may be of metal or plastic with a metal coating, which will ensure that the light passing through the lining can be reflected back into the lining thereby further enhancing the cure.

The resin may contain an additional hardener system which is initiated by the internal heat which will be generated when initation of the curing takes place by the light radiation falling thereon.

As stated herein, any suitable catalyst and matching initiating light radiation system, with any suitable base resin may be used, although we have found that polyester and epoxy resins with suitable light initiating catalysts can be used, when bright acrylic or polypropylene fibres are used. A blend of these fibres may be used when it is required that one or more of the felt layers is to be flame bonded to itself to form a tube.

Although a specific BASF Patutal resin has been described herein, BASF make a number of light curing resins disclosed in various European patent applications and these can be used in the process with suitable initiation radiation of the appropriate wavelength.

I claim:

1. A method of lining the interior of a pipeline or passageway comprising applying to the interior surface of the pipeline or passageway a lining comprising resin absorbent fibrous material which is impregnated with a curable resin containing a radiation initiating catalyst, and effecting or initiating the cure of the resin with the lining in position by light radiation, the resin and fibrous material being selected so that the resin and fibres of the fibrous material have similar refractive indices, and the light being selected to give good penetration of the light radiation into the resin and the fibrous material.

2. A method according to claim 1 wherein the lining when in place against the interior surface of the pipeline has an impermeable membrane to the inner surface thereof, said membrane and lining being substantially transparent to the curing light radiation.

3. A method according to claim 1 wherein the fibrous material contains bright acrylic fibres.

4. A method according to claim 1 wherein the resin is a polyester resin or an epoxy resin.

5. A method according to claim 1 wherein the resin includes an additional curing system.

6. A method according to claim 1, wherein the lining is everted into the pipeline or passageway and is held in position against the interior surface of the pipeline or passageway by clean water, the lamps for effecting the cure being immersed in the said water.

7. The method according to claim 1, wherein the lining is contained in an opaque envelope until it is introduced into a pipeline or passageway.

8. A method according to claim 1 wherein said fibrous material is a needled felt of polypropylene.

9. A method according to claim 1 wherein the surface of the pipeline or passageway is lined with a reflective material.

* * * * *

REEXAMINATION CERTIFICATE (2498th)
United States Patent [19]
Wood

[11] B1 4,581,247
[45] Certificate Issued Mar. 7, 1995

[54] LINING OF PIPELINES AND PASSAGEWAYS

[75] Inventor: Eric Wood, Wellingborough, England

[73] Assignee: Insituform (Netherlands) B.V., Rotterdam, Netherlands

Reexamination Request:
No. 90/003,282, Dec. 20, 1993

Reexamination Certificate for:
Patent No.: 4,581,247
Issued: Apr. 8, 1986
Appl. No.: 686,996
Filed: Dec. 27, 1984

[30] Foreign Application Priority Data

Jan. 5, 1984 [GB] United Kingdom ................. 8400233

[51] Int. Cl.$^6$ ......................... B05D 3/06; B29C 17/00
[52] U.S. Cl. .................................. 427/508; 156/199; 156/272.2; 156/287; 156/294; 156/380.9; 427/230; 427/385.5; 427/386; 427/393.5; 427/558; 427/552

[58] Field of Search ..................... 156/199, 272.2, 287, 156/294, 380.9; 427/230, 385.5, 386, 393.5, 553, 558, 508

[56] References Cited

U.S. PATENT DOCUMENTS

| | | | |
|---|---|---|---|
| 2,944,994 | 7/1960 | Singleton et al. | 260/40 |
| 4,009,063 | 2/1977 | Wood | 156/71 |
| 4,425,287 | 1/1984 | Hesse et al. | 264/22 |

FOREIGN PATENT DOCUMENTS

0025359  3/1981  European Pat. Off. .
0039838  11/1981  European Pat. Off. .

*Primary Examiner*—Michael Lusignan

[57] ABSTRACT

The present invention provides that in the lining of a pipeline or passageway using a flexible lining comprising a resin absorbent felt, the felt is impregnated with a light curing resin, and light radiation is used for effecting the resin cure. The resin and felt are selected so as to be of a similar refractive index, and so that the resin and fibres are substantially transparent to the curing light radiation which is used. The lining is pre-impregnated and then contained a bag, envelope or sachet of opaque material to prevent it from curing prematurely.

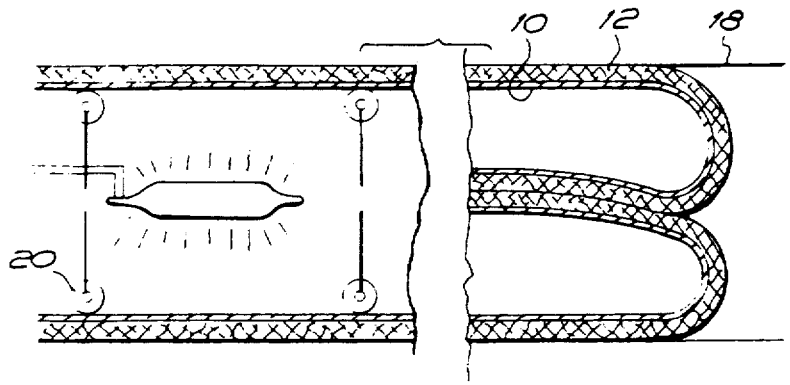

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

1. A method of lining the interior of a pipeline or a passageway comprising applying to the interior surface of the pipeline or passageway a lining comprising resin absorbent fibrous material which is impregnated with a curable resin containing a radiation initiating catalyst, and effecting or initiating the cure of the resin with the lining in position by light radiation, the resin and fibrous material being selected so that the resin *in the uncured state* and fibers of the fibrous material have [similar] *the same or substantially the same* refractive [indices,] *index*, and the light being selected to give [good] penetration of the light radiation into the resin and the fibrous [material.] *material to initiate the cure throughout the lining thickness.*

* * * * *